United States Patent [19]

O'Brien

[11] Patent Number: 5,503,277
[45] Date of Patent: Apr. 2, 1996

[54] DISPLAY HOOK AND COMBINATION

[75] Inventor: Paul O'Brien, Seal Beach, Calif.

[73] Assignee: Side-Kik Corporation, Cypress, Calif.

[21] Appl. No.: 263,753

[22] Filed: Jun. 22, 1994

Related U.S. Application Data

[63] Continuation-in-part of Ser. No. 104,189, Aug. 9, 1993.

[51] Int. Cl.⁶ .................................................. A47H 1/00
[52] U.S. Cl. .............................. 211/94; 211/59.1; 211/87;
248/304; 248/222.51
[58] Field of Search ..................... 211/133, 153,
211/184, 187, 190, 86, 87, 88, 90, 126,
94, 59.1, 57.1; 248/220.3, 220.2, 221.2,
221.3, 231.8, 301, 304; 108/107, 108, 109

[56] References Cited

U.S. PATENT DOCUMENTS

| | | | |
|---|---|---|---|
| 2,794,555 | 6/1957 | Schild | 211/135 |
| 2,845,188 | 7/1958 | Rosenquist et al. | 211/184 |
| 2,915,193 | 12/1959 | Bromberg | 211/135 |
| 2,936,904 | 5/1960 | Streater | 211/147 |
| 3,120,200 | 2/1964 | Travis | 108/107 |
| 3,209,919 | 10/1965 | Hoogstoel | 211/90 |
| 3,341,026 | 9/1967 | Spitler | 211/88 |
| 3,367,291 | 2/1968 | Evans | 108/64 |
| 3,844,231 | 10/1974 | Peacock | 108/107 |
| 3,954,243 | 5/1976 | Sharp et al. | 248/235 |
| 4,103,854 | 8/1978 | Pliml et al. | 248/235 |
| 4,494,661 | 1/1985 | Krusche | 211/87 |
| 4,582,284 | 4/1986 | Veenstra | 248/220.2 |
| 4,671,417 | 6/1987 | O'Brien | 211/59.1 |
| 4,860,905 | 8/1989 | Schott et al. | 248/220.3 X |
| 5,012,997 | 5/1991 | Hutchison | 211/59.1 X |
| 5,022,537 | 6/1991 | Henriquez | 211/88 |
| 5,101,988 | 4/1992 | Meyer | 211/88 |
| 5,109,993 | 5/1992 | Hutchison | 211/59.1 X |
| 5,165,640 | 11/1992 | Williams, III | 248/221.2 |
| 5,235,766 | 8/1993 | Fast et al. | 211/59.1 X |
| 5,379,976 | 1/1995 | Degirolamo | 248/221.2 |

Primary Examiner—Alvin C. Chin-Shue
Assistant Examiner—Korie H. Chan
Attorney, Agent, or Firm—Poms, Smith, Lande & Rose

[57] ABSTRACT

A display hook and rack combination. The rack has a plurality of spaced openings into which the support fingers of a hook may be inserted. The rack has spaced protrusions thereon associated with the spaced openings and engaging the face plate of the hook providing support and stabilization to the hook so that it cannot be easily dislodged when a product, suspended on the hook, is removed therefrom.

13 Claims, 1 Drawing Sheet

DISPLAY HOOK AND COMBINATION

RELATIONSHIP OF CO-PENDING APPLICATION

This application is a continuation-in-part of application Ser. No. 08/104,189, filed Aug. 9, 1993, commonly assigned.

BACKGROUND OF THE INVENTION

1. Field of the Invention

The invention relates to display systems; and more particularly, to display racks having display hooks mounted thereon on which products are suspended.

2. Description of the Related Art

Display racks that are set up in retail stores or the like at the point of sale are well known. Such racks generally are self standing units having a back wall or the like with a plurality of spaced holes or openings into which one end of a support hook is inserted. The hook then extends outwardly from the wall, having an elongated portion for extending through an opening in a display card or the like, a product to be displayed is mounted on the card and, in this manner, a plurality of such products may be displayed to the public at the point of sale. Of course, any suitable product having means allowing it to be suspended from such hooks may be so mounted.

In U.S. Pat. No. 4,671,417, there is disclosed a hook and display panel combination for suspending products therefrom. In this patent, the hook has a gripping finger that extends into a slot on a corrugated cardboard panel. There is no bottom support to the face plate of the hook to the panel. Thus, when a product suspended from such a hook is removed therefrom, the hook may be dislodged from the panel.

In my pending application Ser. No. 08/104,189, filed Aug. 9, 1993, commonly assigned, there is disclosed a display rack having a back wall with a plurality of spaced openings therein. A plurality of spaced outwardly extending protrusions are associated with these spaced openings. These spaced protrusions provide added support to the support members 67 in application Ser. No. 08/104,189, when the gripping fingers 73 are inserted into openings 27. Although this arrangement in pending application Ser. No. 08/104,189 is quite effective, there is a need for a hook that cooperates with such a back panel to self lock therein and not dislodge when a product is removed from suspension from the hook.

Thus, the hook disclosed herein can be used in conjunction with the display panel disclosed in pending application Ser. No. 08/104,189, the teachings of which are incorporated herein by reference.

SUMMARY OF THE INVENTION

It is an object of this invention to provide an improved display hook and rack combination wherein the hook is self locking in an opening in the rack and cannot be easily dislodged when a product, suspended from the hook, is removed therefrom.

It is a further object of this invention to carry out the foregoing object wherein a plurality of strategically placed protrusions on the rack, associated with the openings therein, engage the face plate of the hook and provide added support and stabilization thereto.

These and other objects of the invention are preferably accomplished by providing a display hook and rack combination wherein the rack has a plurality of spaced openings into which the support fingers of a hook may be inserted. The rack has a spaced protrusions thereon associated with the spaced openings and engaging the face plate of the hook for providing support and stabilization to the hook so that it cannot be easily dislodged when a product, suspended on the hook, is removed therefrom.

DESCRIPTION OF THE PREFERRED EMBODIMENT

Figure 1:
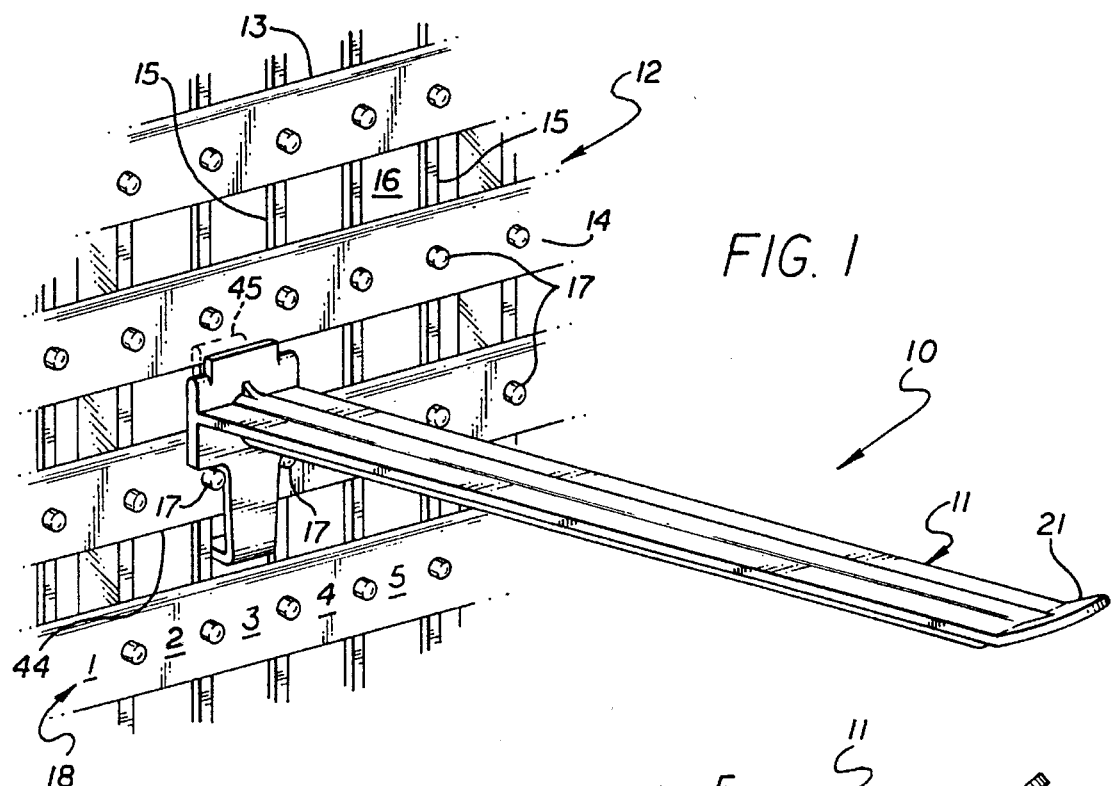
FIG. 1 is a perspective view of a display hook and rack combination in accordance with the teachings of the invention.

Referring now to FIG. 1 of the drawings, a display hook and rack combination 10 is shown. Combination 10 includes a hook 11 and a rack 12. Rack 12, only a portion thereof being shown in FIG. 1, is essentially the same as the rear wall 16 of display rack 10 described and claimed in pending application Ser. No. 08/104,189, filed Aug. 9, 1993, the teachings of which are incorporated herein by reference.

Thus, rack 12, in FIG. 1, includes a back panel 13 having a plurality of horizontally extending flanges or spaced panels 14 interconnected by a plurality of vertically spaced flanges 15. The spacing between successive flanges 15, bordered at top and bottom by panels 14, form spaced openings 16 in back panel 13.

A plurality of spaced protrusions or nubs 17 extend outwardly from panels 14. Thus, nubs 17, as seen in FIG. 1, are generally vertically aligned with the central axes of the vertical flanges 15. Thus, a pair of nubs 17 are associated with each opening 16 below their respective openings 16, on panels 14, and vertically aligned with the flanges 15 defining each respective opening 16. If desired, indicia 18, such as numbers 1, 2, 3, 4, 5, etc. may be associated with each opening in each spaced panel 14 to identify products displayed from each respective opening 16.

Figure 2:
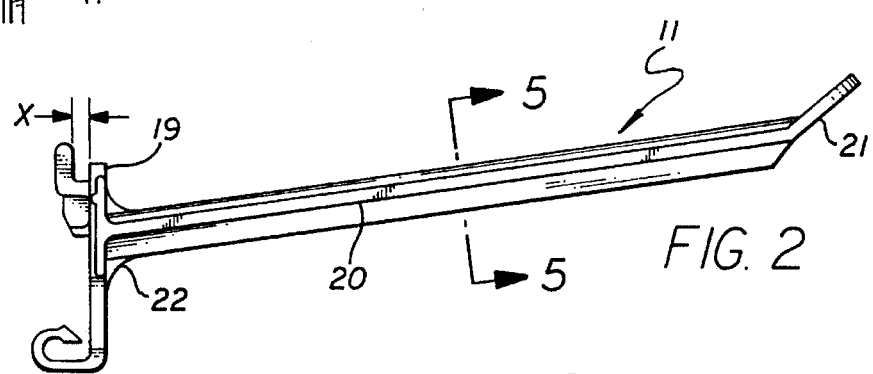
FIG. 2 is an elevational view of the hook alone of FIG. 1.

Hook 11, as particularly shown in FIG. 2, includes a face plate 19 having an elongated support member 20 integral therewith and extending outwardly and at a slight angle from the horizontal upwardly therefrom. Member 20 terminates in an upturned portion 21 at its outer end.

Figure 5:
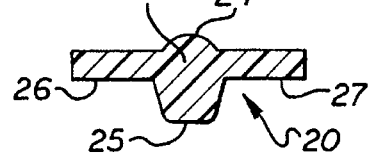
FIG. 5 is a view taken along lines 5—5 of FIG. 2.

One or more triangularly shaped support flanges, such as flange 22, may be provided at the junction of face plate 19 and support member 20 on the underside thereof. As seen in FIG. 5, support member 20, in cross section, has, a central main body portion 23 with an upper domed portion 24 and an integral lower truncated pyramid-shaped portion 25. A pair of laterally extending integral elongated portions 26, 27 extend outwardly from each side of main body portion 23 between the upper and lower portions 24, 25 respectively.

Figure 4:
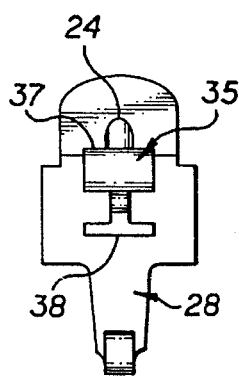
FIG. 4 is a rear view of the hook of FIG. 2.
Figure 6:
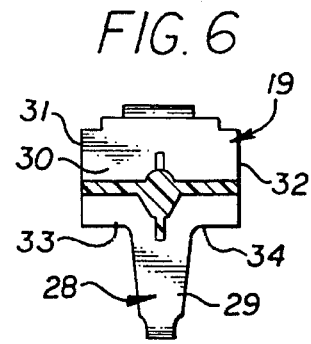
FIG. 6 is a front view of the hook of FIG. 2.

Face plate 19, as seen in FIG. 6, has a generally cross-shaped main body portion 28 having a first lower elongated portion 29 (tapered slightly downwardly, as seen in FIG. 4) and an upper portion 30 having an integral pair of outwardly extending portions 31, 32 (forming undercut areas 33, 34, respectively) on each side of main body portion 28.

Figure 3:
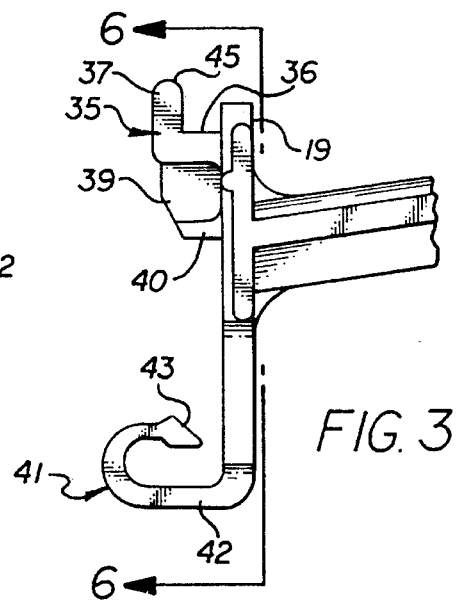
FIG. 3 is a detailed side view of a portion of the hook of FIG. 2.

As seen in FIG. 3, an L-shaped locking member 35 has one leg 36 integral with face plate 19 and extending rearwardly and outwardly therefrom. Leg 36 has an integral vertical portion 37, extending above main body portion 28 (see FIG. 6). A T-shaped (FIG. 4) support flange 38 is provided for supporting locking member 35 having a first flange portion 39 (integral with locking member 35 and the rear or back side of face plate 19 and with an elongated boss 40 integral with both the rear or back side of face plate 19) integral with the bottom of leg 36 of locking member 35. The width of locking member 35 is slightly less than the width of openings 16.

A curved stabilizing support 41 is provided at the bottom of face plate 19 having a first portion 42 extending rearwardly from face plate 19 at the bottom thereof and generally normal to the vertical plane thereof, then curved back around and to a final portion 43 extending generally parallel to portion 42 (terminating before face plate 19).

Support hook 11 (and even rack 12) may be easily injection molded from any suitable inexpensive lightweight plastic, and may have any number of suitable strengthening hubs or flanges. By making hook 11 in this manner, support 41 is resilient for reasons to be discussed. Of course, other materials may be used but, if so, support 41 is preferably of a stiff resilient material to provide stabilization to hook 11 as will be discussed.

Thus, in assembling hooks 11 to panel 12, one grasps hook 11 by elongated support member 20, inserts locking member 35 into one of the openings 16 in panel 12 and pushes support 41 inwardly in one of the openings 16 in panel 12 directly above the opening 16 into which support member 20 has been inserted (see FIG. 1). Support 41, being resilient, biases upwardly against the lowermost edge 44 (FIG. 1) of panel 14 while nubs 17 support face plate 19 in undercut areas 33, 34 as seen in FIG. 1. Also, as seen in dotted lines in FIG. 1, the upper end 45 of vertical portion 37 of locking member 35 extends above edge 44 of the panel 14 and thus abuts against the backside thereof. The spacing X (FIG. 2) is generally related to the width or thickness of panels 14 so that finger 11 is wedged therein.

It can be appreciated that support 41 allows hook 11 to be self locking, and hook 11 cannot be easily dislodged when products suspended from elongated member 20 are removed therefrom. However, hook 11 can be quickly and easily released from engagement with panel 12 by grasping tip 21 and lifting it upwardly; this releases support 41 from its resilient locking engagement with panel 14 and allows hook 11 to be disengaged.

Although panel 12 in my co-pending application Ser. No. 08/104,189, is part of a freestanding display rack, obviously, panel 12 herein may be a panel that is supported by any suitable means in a retail store or the like, such as from a wall, panelling, peg board, etc.

Any suitable dimensions may be used. For example, the spacing between successive hubs 7 and openings 16 may be about one-half inch center to center. The width of nubs 17 may be about 0.09 inches. Openings 16 may be about 0.51 inches in width. Thus, the spacing of face plate 19 between opposed undercut areas 33, 34 may be about 0.5 inch so that nubs 17 may be disposed therein as seen in FIG. 1.

Although a particular embodiment of the invention has been disclosed, variations thereof may occur to an artisan and the scope of the invention should only be limited by the scope of the appended claims.

I claim:
1. A display rack and hook combination for supporting products therein comprising:
   a wall having a plurality of vertically spaced rows of horizontally aligned openings therein;
   a plurality of vertically spaced rows of horizontally aligned nubs protruding from said wall between said successive vertically spaced rows of openings;
   at least one display hook mounted in one of said openings, said display hook having a face plate having a substantially planar rear surface, an L-shaped, locking member having a width slightly less than that of said rectangular opening such that said locking member is substantially coextensive with said opening to prevent movement of said locking member within said opening by forces acting on said face plate in a direction parallel thereto, said locking member having a first leg attached to said face plate rear surface at a position sufficiently below an upper edge of said face plate such that a portion of said face plate rear surface extends above said first leg and in contact with said wall immediately above said opening when said hook is mounted therein for resisting movements acting upwardly on said face plate, said locking member first leg extending rearwardly from said face plate rear surface through said opening for a distance slightly greater than said wall material thickness and upwardly for a length sufficient to abut against the back of said wall, said face plate having a lower portion with a width slightly less than the spacing between successive ones of said horizontally aligned nubs and an upper portion of a width greater than the width of said lower portion, the intersection of said upper and lower portions forming undercut areas on opposite sides of said face plate whereby said lower portion can be maintained between successive ones of said hubs when said locking member is mounted in one of said openings with said undercut areas being supported by said successive ones of said nubs, and a resilient support extending rearwardly from said face plate lower portion into one of said openings vertically spaced from said one of said openings into which said locking member extends, and an elongated support member cantilevered outwardly from the front of said face plate for supporting one of said products therefrom, said support member being angled slightly upwardly from the horizontal and terminating in an upturned portion at its outer end.
2. In the combination of claim 1, wherein said support is of a resilient material.
3. In the combination of claim 2, wherein said support includes a first portion integral with said face plate lower portion and extending in a direction away from said support member, then curving back over said last mentioned first portion and abutting against an upper edge of one of said openings into which said support extends.
4. In the combination of claim 1 wherein the upper portion and the lower portion of said face plate define a main body portion that is generally cross-shaped in configuration.
5. In the combination of claim 1 wherein said upper portion of said face plate is wider than the width of said openings.
6. In the combination of claim 1 wherein said locking member includes a second leg integral with said first leg extending upwardly away from said first leg and spaced from said face plate and generally parallel to the plane of said face plate.
7. In the combination of claim 6 wherein the spacing between said second leg and said face plate is slightly greater than the thickness of said wall.

8. In the combination of claim 6 wherein said face plate has said upper edge and said second leg extends above the upper edge of said face plate.

9. The combination of claim 1 wherein said locking member first leg is supported to the back of said face plate by a flange extending between said face plate and said back of said face plate and integral therewith.

10. In a combination hook and display rack wherein the display rack has a plurality of vertically spaced openings into which a hook can be mounted, said vertically spaced openings being defined by a plurality of spaced interconnecting horizontally extending panels, a plurality of spaced vertically extending spaced flanges interconnecting said panels thereby forming said spaced openings therebetween, a plurality of horizontally aligned nubs protruding outwardly from said panels between successive vertically spaced rows of said openings, the hook comprising:

a face plate having a front wall and a rear wall and an upper edge and a lower edge;

an elongated support member cantilevered outwardly from said front wall, said support member being angled slightly upwardly from the horizontal and terminating in an upturned portion at its outer end;

an L-shaped locking member having a first leg extending from the rear wall of said face plate and a second leg integral with the first leg extending upwardly from said first leg, spaced from said rear wall and generally parallel thereto and above the upper edge thereof; and a support integral with said lower edge extending in a direction opposite that of said support member.

11. In the hook of claim 10 wherein said support includes a first portion extending generally parallel to said first leg, then curving back inwardly toward said rear wall forming a second portion spaced from said last mentioned first portion and terminating before said rear wall.

12. In the hook of claim 11 wherein said support is of a resilient material.

13. In the hook of claim 10 wherein said face plate includes an upper portion and a lower portion which together define a main body portion that is generally cross-shaped in configuration, said lower portion of said face plate being of a width less than said upper portion of said face plate, the intersection of said first and second face plate portions forming undercut areas.

* * * * *